(12) United States Patent
Hurd et al.

(10) Patent No.: US 6,391,129 B1
(45) Date of Patent: May 21, 2002

(54) ALUMINIUM EXTRUSION ALLOY

(75) Inventors: Timothy John Hurd, Akersloot (NL); Klaus Vieregge, Neuwied (DE); Louis Walter Marie Paul Tack, Reet; Arne Mulkers, Antwerpen, both of (BE)

(73) Assignees: Corus Aluminium N.V., Duffel (BE); Corus Aluminium Walzprodukte GmbH, Koblenz (DE)

( * ) Notice: Subject to any disclaimer, the term of this patent is extended or adjusted under 35 U.S.C. 154(b) by 0 days.

(21) Appl. No.: 09/588,752

(22) Filed: Jun. 7, 2000

Related U.S. Application Data

(60) Provisional application No. 60/138,608, filed on Jun. 11, 1999.

(51) Int. Cl.$^7$ .......................... C22F 1/04; B23K 103/10
(52) U.S. Cl. ...................... 148/690; 148/697; 228/207; 228/214; 228/223
(58) Field of Search .................. 228/207, 214, 228/219, 223; 148/690, 697

(56) References Cited

U.S. PATENT DOCUMENTS

| | | | |
|---|---|---|---|
| 4,589,932 A | | 5/1986 | Park |
| 5,180,098 A | * | 1/1993 | Halstead et al. ............ 228/183 |
| 5,342,459 A | | 8/1994 | Klemp et al. |
| 5,785,776 A | * | 7/1998 | Sircar ......................... 148/690 |
| 6,065,534 A | * | 5/2000 | Sicar .......................... 165/178 |

FOREIGN PATENT DOCUMENTS

| | | |
|---|---|---|
| EP | 0676480 | 10/1995 |
| EP | 0718072 | 6/1996 |
| GB | 2318586 | 4/1998 |
| JP | 07003409 | 1/1995 |
| JP | 08225874 | 9/1996 |
| JP | 08232035 | 9/1996 |

OTHER PUBLICATIONS

Hatch, J. "Aluminum, Properties and Physical Metallurgy", pp. 26, 225 and 236 (1984).

* cited by examiner

Primary Examiner—George Wyszomierski
Assistant Examiner—Janelle Combs Morillo
(74) Attorney, Agent, or Firm—Stevens, Davis, Miller & Mosher, LLP

(57) ABSTRACT

The invention relates to an aluminium extrusion alloy comprising in weight percent: Mn 1.0–1.4, Cu 0.2–2.0, Mg 0.1–0.6, Si 0.15–1.0, Fe 0.8 max., Zn 0.25 max., Ti 0.15 max., Cr 0.35 max., Zr and/or V in total 0.25 max., others up to 0.05 each, total 0.15, balance aluminium, and with the proviso that (Cu+Mg)>0.7, and which aluminium extrusion alloy is particularly suitable for application in brazed assemblies, and the invention further relates to a method of its manufacture.

45 Claims, No Drawings

ALUMINIUM EXTRUSION ALLOY

CROSS REFERENCE TO RELATED APPLICATION

This claims priority from U.S. provisional patent application serial No. 60/138,608, filed Jun. 11, 1999, incorporated herein by reference in its entirety.

FIELD OF THE INVENTION

The invention relates to an aluminium extrusion alloy and extruded sections thereof, containing Mn, Mg, Cu and Si, which aluminium extrusion alloy is particular suitable for application in brazed assemblies, and further to a method of its manufacture.

DESCRIPTION OF THE RELATED ART

In the prior art, aluminium alloys are the alloys of choice for heat exchanger applications. These alloys are selected for their desirable combination of strength, low weight, good thermal and electrical conductivity, brazeability, corrosion resistance and formability.

Typical applications include automotive heater cores, radiators, evaporators, condensers, charge air coolers, and transmission/engine oil coolers.

At present brazed beat-exchanger devices, such as for example automotive radiators, are often provided with mechanical fasteners made of extruded Aluminium Association (AA)6063-series alloy, preferably in a T8-temper. A T8-temper involves solution heat treatment of the extruded product, cold working and then artificially ageing. This application requires excellent mechanical properties and a good machinability of the extruded product for putting in a mechanical thread. Additionally at least a reasonable corrosion resistance is required. The chemical composition of standard AA6063 alloy is, in weight percent:

| | |
|---|---|
| Si | 0.2–0.6 |
| Mg | 0.45–0.9 |
| Fe | 0.35 max. |
| Cu | 0.1 max. |
| Mn | 0.1 max. |
| Cr | 0.1 max. |
| Zn | 0.1 max. |
| Ti | 0.1 max. |

Further the AA6063 alloy is extensively used in the T6 (artificially aged) temper. When AA6063 alloy is being applied in combination with a Controlled Atmosphere Brazing (CAB) process, a brazing flux is applied to enhance the brazeabilty of the brazing alloy. A well known CAB brazing process is the Nokolok (trade name) brazing process and involves the use of a non-corrosive flux made up of a mixture of potassium and fluoroaluminates. The flux functions at brazing temperatures by melting, spreading and dissolving the oxide film. However, due to the presence of the magnesium in the AA6063 alloy the flux material tends to get poisoned by the formation of MgO, which results in a bond of poor quality. This disadvantage can only be partly be overcome by applying higher loads of brazing flux material. Another solution would be the application of mechanical fasteners made of AA3003 material since it comprises magnesium in a range of up to 0.05%. But this material is too weak to put in a thread, leading to pull out on testing. The chemical composition of standard AA3003 alloy is, in weight percent:

| | |
|---|---|
| Si | <0.6 |
| Fe | <0.7 |
| Cu | 0.05–0.20 |
| Mn | 1.0–1.5 |
| Zn | 0.10 | balance aluminium and inevitable impurities.

Some other disclosures of aluminium extrusion alloys found in the prior art literature will be mentioned below.

U.S. Pat. No. 5,342,459 (Alcoa) discloses an aluminium extrusion alloy and a method of its manufacture, the alloy consisting of, in weight percent:

| | |
|---|---|
| Mg | 0.5–1.3 |
| Si | 0.4–1.2 |
| Cu | 0.65–1.2 |
| Mn | 0.1–1.0 | balance aluminium and inevitable impurities.

U.S. Pat. No. 4,589,932 (Alcoa) discloses an aluminium extrusion alloy and a method of its manufacture, the alloy consisting of, in weight percent:

| | |
|---|---|
| Mg | 0.5–1.3, preferably 0.7–1.2 |
| Si | 0.4–1.2, preferably 0.6–0.9 |
| Cu | 0.6–1.1, preferably 0.6–0.95 |
| Mn | 0.1–1.0, preferably 0.2–0.6 |
| Fe | <0.6 | and with the proviso that %Mg>%Si+(0.1 to 0.4)

balance aluminium and inevitable impurities.

In order to improve the machining characteristics of the alloy each of lead and bismuth in a range of 0.3 to 0.7% may be added to the alloy.

EP-A-0676480 (Northwest Aluminum) discloses two very wide groups of high strength Al-Mg-Si extrusion alloys.

The first group of aluminium alloys consists of in weight percent:

| | |
|---|---|
| Si | 0.2–2.0 |
| Mg | 0.3–1.7 |
| Cu | 0.32–1.2 |
| Mn | 0–1.1 |
| Cr | 0.01–0.4 | at least one element selected from the group consisting of:

| | |
|---|---|
| V | 0.01–0.3 |
| Be | 0.001–0.1 |
| Sr | 0.01–0.1 | balance aluminium and inevitable impurities.

The second group of aluminium alloys consists of, in weight percent:

| Si | 0.6–1.2 |
|---|---|
| Mg | 1.0–1.6 |
| Cu | 0.4–1.0 |
| Mn | <0.05 |
| Cr | 0.05–0.3 | at least one element selected from the group consisting of:

| V | 0.01–0.3 |
|---|---|
| Be | 0.001–0.05 |
| Sr | 0.01–0.1 | balance aluminium and inevitable impurities.

Both aluminium extrusion alloys are preferably provided in a T6-temper condition.

WO-A-99/07906 (Hoogovens) discloses an aluminium alloy for welded structures and brazing application, having the following composition in weight percent:

| Mg | 0.5–1.5 |
|---|---|
| Zn | 0.1–3.8 |
| Si | 0.05–1.5 |
| Mn | 0.2–0.8 |
| Zr | 0.05–0.25 |
| Cr | <0.3 |
| Cu | <0.3 |
| Fe | <0.5 |
| Ag | <0.4 |
| Ti | <0.2 | balance aluminium and inevitable impurities.

SUMMARY OF THE INVENTION

An object of the present invention is to provide an aluminium extrusion alloy capable of obtaining post-brazing mechanical properties and corrosion resistance at least comparable to standard AA6063, and being capable of being processed in at least a Controlled Atmosphere Brazing (CAB) process.

A further object of the present invention is to provide an aluminium extrusion alloy having machinability characteristics at least equal to standard AA6063 extruded products, typically in a T8-temper.

Another object of the present invention is to provide a method of manufacturing extruded sections of the new aluminium alloy.

And another object of the present inventions is to provide a method of manufacturing an assembly of brazing components, wherein one of the components is made from the aluminium extrusion alloy of the invention.

According to the invention in one aspect there is provided an aluminium extrusion alloy having the following composition in weight percent:

| Mn | 1.0–1.4 |
|---|---|
| Cu | 0.2–2.0 |
| Mg | 0.1–0.6 |
| Si | 0.15–1.0 |
| Fe | 0.8 max. |

-continued

| Zn | 0.25 max. |
|---|---|
| Ti | 0.15 max. |
| Cr | 0.35 max. |

Zr and/or V in total 0.35 max.

others up to 0.05 each, total 0.15 balance Al, and with the proviso that (Cu+Mg)>0.7.

In this way it is achieved that the aluminium extrusion alloy of the invention has similar post-braze mechanical strength as compared to AA6063 in the same temper and better than AA3003 material, a corrosion resistance as tested in a SWAAT test environment equivalent to AA6063 material in the same temper, and further the machinability characteristics of the present extrusion alloy are equal to or better than AA6063 material in the same temper and better than AA3003 material. Further the aluminium extrusion alloy of the invention can be used to manufacture devices via a brazing process, and in particular in a Controlled Atmosphere Brazing process.

It should be mentioned here that the aluminium alloy composition range is known from BP-A-0718072, in which document it is mentioned that the alloy is used as a rolled product only as core alloy for brazing sheet having on at least one side thereof a brazing layer of an aluminium alloy containing silicon as main alloying element.

The reasons for the limitations of the alloying elements of the aluminium extension alloy according to the invention are described below. All compositions are by weight.

Mn is an important alloying element in the alloy according to the invention. And should be in the range of 1.0 to 1.4%. Below 1.0% there is not a sufficient effect, and above 1.4% it may result in the formation of detrimental large intermetallic particles. In this range the Mn present allows for a solid solution hardening effect because sufficient Mn is retained in solid solution for the desired increase in strength.

Cu is one of the main alloying elements in order to obtain the desired strength level, in particular by means of solution hardening. At least 0.2% is required for obtaining the desired strength and corrosion resistance, while a Cu content of over 2.0% does not produce any significant improvements in respect of strength, and may further result in the formation of detrimental low-melting eutectics. A more preferred lower limit for the Cu level is 0.5%. A more preferred Cu content is in a range of 0.65 to 1.5% in order to achieve an optimisation in the desired properties. A very suitable range for the Cu-content is 0.65 to 0.9% as a compromise in mechanical strength after extrusion, mechanical strength in the post-braze condition, post-braze corrosion resistance and extrudability.

Mg is another main alloying elements in combination with the Cu and Si present in order to obtain the desired properties. The Mg can be present in the range of 0.1 to 0.6%. In case the extrusion alloy is used for application in a Controlled Atmosphere Brazing process a more suitable Mg-content is in the range of 0.1 to 0.35%. In case the extrusion alloy is used for application in a vacuum brazing process a suitable Mg-content is in the range of 0.3 to 0.6%.

For strength and corrosion resistance preferably the proviso (Cu+Mg)>1.0 is met. Thereby a good corrosion resistance of a product manufactured via a brazing process is obtained.

Si is another important alloying element in the aluminium alloy according to this invention. The main reason is to enable the formation of $Mg_2Si$ precipitation required to improve the strength by means of ageing before and after brazing. Further, the addition of Si results in an increased solution hardening of the alloy after brazing. Below 0.15% there is no effect of the Si, and above 1.0% it may result in the formation of detrimental low-melting eutectics and also in the formation of large intermetallic particles. A more suitable minimum level of Si is 0.20%, more preferably of 0.30%, and most preferably of 0.40%. A more suitable maximum level of Si is 0.70%, and more preferably 0.60% as a compromise in extrudability, tensile strength and corrosion resistance.

Fe is a known impurity element in this type of aluminium alloys. Its presence should be limited to a maximum of 0.8%, and preferably to a maximum of 0.4%, in order to optimise the mechanical properties and extrudability.

Zn is considered to be an impurity element also and can be tolerated up to 0.25%, but is preferably less than 0.15%, and more preferably less than 0.10%.

Ti is important as a grain refiner during solidification of cast extrusion billets or ingots. The preferred range of Ti is not more than 0.15%, but preferably is less than 0.10%, and more preferably is less than 0.05%.

Cr improves the corrosion resistance of the alloy. However, Cr limits the solubility of Mn and further reduces the extrudibility of the aluminium alloy. Therefor, to avoid formation of coarse primaries and to improve extrusion capability, the Cr content must not be more than 0.35%, preferably not more than 0.2%, and more preferably less than 0.05%.

The optionally added Zr and/or V improves amongst other things the strength of the aluminium extrusion alloy. A more preferred maximum for these elements alone or in combination is 0.25%. A more suitable level of these elements alone or in combination is in the range of 0.05 to 0.25%.

Although Cr, Zr and V can de added in the given ranges to control extrudibility and mechanical properties, in a preferred embodiment of the aluminium extrusion alloy according to the invention, each of Cr, Zr and V are at impurity level, meaning below 0.05%, in order to control the costs of the aluminium alloy and to increase its recycleability.

The balance is aluminium and inevitable impurities. Typically each impurity element is present at 0.05% maximum, arid the total of impurities is 0.15% maximum.

The invention is further embodied in an extruded section having a composition of the aluminum alloy of this invention as set out above. The extruded section can be provided at least in any one of a number of tempers selected from the following types T3, T4, T6, T8 and T9, or modifications thereof.

The invention also provides in a method of manufacturing an extruded section comprising the aluminium extrusion alloy set out above, which method comprises the following sequential steps:

(a) casting the aluminium alloy into ingots;

(b) preheating the cast ingot;

(c) hot extrusion of the preheated cast ingot into an extruded product;

(d) rapid cooling of the extruded product to below 150° C.;

(e) ageing of the product.

In this way a method is provided which allows for the production of extruded sections capable of obtaining similar post-braze mechanical strength as compared to AA6063 in the same temper and better than AA3003 material, a corrosion resistance as tested in a SWAAT test environment equivalent to AA6063 material in the same temper, and further to obtain machinability characteristics equal to or better than AA6063 material in the same temper and better than AA3003 material. Further the aluminium extrusion alloy obtained by the method according to the invention can be used to manufacture devices via various brazing processes, and in particular in a Controlled Atmosphere Brazing process.

For casting the inventive aluminium alloy into ingots or extrusion billets in any diameter both continuous and semi-continuous casting processes can be used. Different configurations of castings can also be used to produce the desired extrusion shape.

After casting, the aluminium alloy may be homogenised. The aim of the homogenising treatment is amongst other things, to homogenise the microstructure, to dissolve the relevant elements or components such as $Mg_2Si$, to level off possible residual stresses resulting from the casting process, and to spheroidize sharp or needle shaped intermetallic compounds formed during solidification of the aluminium alloy. A homogenisation treatment in the temperature range of 560 to 610° C. for a soaking time in the range of 5 to 24 hours results in the optimised properties. A longer homogenisation time is not disadvantageous, but is not required and only serves to raise the costs of production. Alternatively the homogenisation treatment may be omitted. Omitting the homogenisation treatment still allows for very good extrusion characteristics, and resulting in a final extruded product having an improved post-braze mechanical properties while the corrosion resistance is somewhat reduced.

After casting or following homogenisation treatment, the cast billets are preheated at temperatures between 500 and 540° C.

Subsequently, the ingot or extrusion billet is processed into products via a hot extrusion process, wherein either direct or indirect extrusion techniques may be used. The ingot temperature during extrusion is preferably in the range of 500 to 540° C. Using a hot extrusion process the aluminium alloy in accordance with the invention can be processed in both solid and hollow extruded sections. In this temperature range it has been found that the alloy in accordance with the invention has a high extrudability, and very similar to AA6063 alloys.

It should be understood that the aluminium extrusion alloy in accordance with the invention can be extruded in any configuration including channels, bars, seat rails, I-beams, angles, tubing, heat exchanger tubing, architectural shapes, rectangular hollows, rods, or other complex extruded shapes.

After extrusion, the alloy of the invention should be rapid cooled to below 150° C. by means of water or water spray in order to prevent or minimize uncontrolled precipitation. This is also designated by the term "press-quenching". Following cooling to below 150° C., the extruded section is further cooled to about room temperature.

In a following step, the extruded product is aged to the desired level of mechanical and physical properties. The ageing may be natural ageing (at ambient temperature) and/or artificial ageing at an elevated temperature, preferably in the range of 100 to 250° C. A natural ageing period of 3 months is typical for this. Artificial ageing can result in an 0.2% yield strength of 270 MPa or more. Preferably the artificial ageing is executed for a time period in the range of 1 to 100 hours. For example, the artificial ageing is executed at about 160° C. for a time period in the range of 3 to 100 hours, preferably for a time period in the range of 3 to 15 hours, or at an equivalent combination of time and temperature giving a similar ageing effect.

In order to ether improve the mechanical properties the extruded product is cold worked after extrusion. The cold working may be performed prior to or after the ageing treatment, but there is a preference for cold working prior to the ageing treatment. The product may be cold worked, for example, by drawing or stretching up in the range of 4 to 20% of its original length. Preferably, the cold reduction is in the range of 5 to 18% of its original length to optimise properties The extruded section can be provided in at least any one of the following tempers selected from the group of T3 (solution heat treated, cold worked, and naturally aged to a substantially stable condition), T4 (solution heat treated and naturally aged to a substantially stable condition), T6 (solution heat treated and then artificially aged), T8 (solution heat treated, cold worked, and then artificially aged), T9 (solution heat treated, artificially aged, and then cold worked), and modifications thereof.

By artificial ageing treatment the extruded section is capable of obtaining an 0.2% yield strength of at least 270 MPa or more, and preferably of 280 MPa or more. Further, by artificial ageing treatment the extruded section is capable of obtaining an ultimate tensile strength of 290 MPa or more, preferably of 310 MPa or more, and in the best examples of 325 MPa or more.

In a further embodiment of the method in accordance with the invention the extruded and aged section may be worked into a more suitable shape, for example by means of machining. The worked product may be added to an assembled device, for example an automotive radiator, which device is subsequently joined in a brazing process. Following the brazing cycle the brazed assembly together with the worked product is cooled to below 100° C. and preferably to room temperature by a set cooling rate. Following cooling to room temperature the brazed assembly is allowed to age to final desired mechanical properties. The extrusion alloy of the invention is capable of obtaining a post-braze 0.2% yield strength of at least 100 MPa or more, preferably of 120 MPa or more, and in the best examples of 140 MPa or more, and a post-braze ultimate tensile strength of at least 200 MPa or more, and preferably of 220 MPa or more, by means of natural ageing at ambient temperatures. If desired the extrusion alloy in accordance with the invention is capable of reaching even higher mechanical properties when artificially aged.

An advantage of the application of the extrusion alloy in accordance with the present invention is that it provides high mechanical properties both before and after a brazing cycle. The mechanical properties are at least similar to AA6063 material in the same temper, while the inventive alloy further allows for a favourable processing in a CAB brazing process.

In another aspect of the invention there is provided a method of manufacturing an assembly of brazed components, comprising the steps of:

(a) forming said components of which at least one is made from an aluminium extrusion alloy as set out above or the extruded section obtained from the method as set out above;

(b) assembling the components into an assembly;

(c) brazing the assembly at elevated temperature for a period long enough for melting and spreading of the filler material;

(d) cooling the brazed assembly to below 100° C.;

(e) ageing of the brazed and cooled assembly to achieve an 0.2% yield strength of at least 100 MPa, and preferably of at least 120 MPa, and more preferably of at least 140 MPa or more.

In accordance with the invention it has been found that the cooling rate after the brazing cycle plays a role in obtaining the desired strength level of the brazed assembly. The cooling rate should not be below 30° C./min. More preferably the cooling rate after brazing is at least 50° C./min, and more preferably at least 60° C./min, and most preferably at least 70° C./min. Increasing the cooling rate after the brazing cycle can give rise to a further increase in the obtainable strength levels. Surprisingly it has been found that extruded sections having a composition in accordance with the invention as set out above and which have been homogenised during their manufacture from a cast ingot into extruded sections respond to the influence of the cooling rate after brazing. Whereas the extruded sections having a composition in accordance with the invention as set out above and which have not been homogenised during their manufacture from a cast ingot into extruded sections respond to a much lesser extend on the cooling rate after brazing and the subsequent ageing.

In a preferred embodiment of the method during the brazing step (c) a controlled atmosphere (CAB) is being used whereby a suitable brazing flux material is used.

In another aspect of the invention there is provided a brazed assembly comprising at least one member being an extruded section comprising the aluminium alloy of the invention, and having a post-braze 0.2% yield strength of at least 100 MPa or more, preferably of at least 120 MPa or more, and more preferably of at least 140 MPa or more.

EXAMPLES

The aluminium extrusion alloy and the method of its manufacture in accordance with the invention will now be illustrated by non-limitative examples.

Example 1

On an industrial scale of testing four alloys composition in accordance with the invention, see Table 1, have been DC-cast into 300 diameter billets. Three have been homogenised for 8 hours at 600° C., and one has not been homogenised. Sequentially all billets have been preheated to about 500° C. and then extruded at about 520° C. into rods of 30 mm or 15 mm diameter, then press quenched to below 150° C., cooled to room temperature, cold worked for various cold working degrees and artificial aged to T8-temper by holding for 10 hours at 160° C. In Table 2 an overview is given of the processing parameters applied.

The extruded rods have been tested for their mechanical properties, 0.2% yield strength (0.2% YS), ultimate tensile strength (UTS) and elongation at fracture ($A_{50}$), see Table 2, and for their machinability characteristics. Table 3 shows typical properties of AA6063-T8 and AA3003-H111 extruded material.

The machinability characteristics of the alloy of the invention is similar to or better than AA6063 material in the same T8-temper; both give about 1 cm long, spiral or curly chips. The machinability is much better than AA3003 material, which gives unbroken chips being arranged around the cutting tools. Further it is believed that from a machinability point of view a T9-temper provides better results than T8-temper material, resulting in shorter chips and the cut surface is more shiny and more smooth.

From Table 2 and 3 it can be seen that the alloy of the invention is capable of obtaining similar or better mechanical properties than AA6063 material, both alloys being in the T8-temper. Further it can be seen that non-homogenised material has mechanical properties in the same range as homogenised material. The alloy of the invention is capable of obtaining mechanical properties significantly better than AA3003-H111 material, which material would be the normal alternative for AA6063 when further processed in a CAB brazing process.

TABLE 1

Alloy composition in weight %.

| Alloy | Si | Fe | Cu | Mn | Mg | Balance |
|---|---|---|---|---|---|---|
| 1 | 0.47 | 0.23 | 0.73 | 1.14 | 0.31 | Al + impurities |
| 2 | 0.45 | 0.29 | 0.81 | 1.17 | 0.30 | Al + impurities |
| 3 | 0.5 | 0.23 | 0.70 | 1.25 | 0.29 | Al + impurities |
| 4 | 0.46 | 0.21 | 0.74 | 1.09 | 0.30 | Al + impurities |

TABLE 2

Processing parameters and mechanical properties in T8-temper.

| | Alloy 1 | Alloy 2 | Alloy 3 | Alloy 4 |
|---|---|---|---|---|
| Homogenisation [T/t] | 600° C./ 8 h. | 600° C./ 8 h. | no | 600° C./8 h. |
| Press speed [m/min] | 5 | 5 | 5 | 5 |
| Extrusion ratio | 17.2 | 20.8 | 17.2 | 17.2 |
| Diameter rod [mm] | 30 | 15 | 30 | 30 |
| Press quench | yes | yes | yes | yes |
| Cold Reduction [%] | 14 | 17 | 14 | 18 |
| Ageing [T/t] | 160° C./ 10 h. | 160° C./ 10 h. | 160° C./ 10 h. | 160° C./ 10 h. |
| Mechanical properties | | | | |
| 0.2% YS [MPa] | 282 | 286 | 290 | 304 |
| UTS [MPa] | 313 | 325 | 326 | 332 |
| $A_{50}$ [%] | 10 | 12 | 12 | 10 |
| Hardness [HB] | 84 | 83 | 84 | 85 |

TABLE 3

Comparable extended material.

| Property | AA6063-T8 | AA3003-H111 |
|---|---|---|
| 0.2% YS [MPa] | 270 | 70 |
| UTS [MPa] | 290 | 135 |
| $A_{50}$ [%] | 15 | 35 |
| Hardness [HB] | 80 | 40 |

Example 2

The alloys as manufactured in Example 1 will usually be provided to customers in the aged condition for further application. In case the material is used to manufacture a brazed assembly, the material is preferably in a T8- or T9-temper. When used in manufacturing a brazed assembly, the alloy of the invention will be subjected to a heat-treatment in accordance to the braze cycle, which affects its mechanical properties. In order to investigate this influence extruded material of alloys 2, 3 and 4 of example 1 in the T8-temper has been subjected to a simulated braze cycle, where the material is heated up to 538° C. in 10 min., then further heated from 538 to 591° C. in 6 min, a dwell time of 3 min at 591° C., and then cooled with variable cooling rates.

Following cooling the material has been natural aged and tested for its mechanical properties, average over two samples tested. Also AA6063 material has been subjected to this simulated braze cycle, and tested. The results of the mechanical properties are listed in Table 4. The post-braze 0.2% yield strength (PS), ultimate tensile strength (UTS), and elongation (Elong.) of AA3003 material is typically in the range of 30–40 MPa, 95–140 MPa, and 28% respectively. Following brazing the material has also been tested for 15 days in a SWAAT test environment, which is equivalent to long life properties for sheet material From the results of Table 4 it can be seen that the alloy of the invention has significant higher post-braze mechanical properties than AA3003-material. Further it can be seen that that for homogenised material the mechanical properties tend to increase with increasing cooling rate after brazing. However, non-homogenised material (Alloy 3 material) shows almost no influence of the cooling rate after brazing on the post-braze mechanical properties. Further, the non-homogenised material has significantly higher strength and lower elongation directly after brazing and shows almost no influence of natural ageing time. The results with respect to the non-homogenised material were unexpected and can not readily be explained. The alloy of the invention is capable of obtaining mechanical properties at least similar to AA6063 material.

After 15 days in a SWAAT test, the AA6063 material showed a shiny bright surface with only slight pitting with a PA qualification. Alloy 2 material showed also a shiny bright surface with somewhat deeper pits with a PA qualification. The alloy 4 material showed uniform attack and was given a PB qualification. The alloy 3 materials showed a uniform attack, and was given a PB/C qualification. From these results it can be concluded that the alloy in accordance with the invention is capable of obtaining an equivalent corrosion resistance as AA6063 material.

TABLE 4

Post-braze mechanical properties as function of alloy composition, days of natural ageing after brazing and cooling rate after the braze cycle.

| | 5 days natural ageing | | | 30 days natural ageing | | |
|---|---|---|---|---|---|---|
| Material | PS [MPa] | UTS. [MPa] | Elong. [%] | PS [MPa] | UTS [MPa] | Elong. [%] |
| Alloy 2–15 mm rod | | | | | | |
| 50° C./min | 153 | 225 | 15 | 159 | 232 | 19 |
| 70° C./min | 161 | 235 | 18 | 157 | 231 | 17 |
| Alloy 3–30 mm rod (non-homogenised) | | | | | | |
| 30° C./min | 165 | 239 | 9 | 163 | 237 | 16 |
| 50° C./min | 166 | 238 | 8 | 167 | 238 | 15 |
| 70° C./min | 169 | 238 | 8 | 166 | 238 | 15 |
| Alloy 4–30 mm rod | | | | | | |
| 50° C./min | 96 | 143 | 18 | 95 | 135 | 19 |
| 70° C./min | 103 | 148 | 16 | 98 | 151 | 19 |
| AA6063 - 30 mm rod | | | | | | |
| 50° C./min | 92 | 143 | 21 | 108 | 148 | 21 |
| 60° C./min | 93 | 141 | 23 | 107 | 152 | 19 |
| 70° C./min | 102 | 158 | 23 | 110 | 181 | 20 |

Having now fully described the invention, it will be apparent to one of ordinary skill in the at that many changes and modification can be made without departing from the spirit or scope of the invention as herein described.

What is claimed is:

1. A method of use comprising, applying brazing flux to a member comprising an aluminium extrusion alloy of composition in weight %:

| | |
|---|---|
| Mn | 1.0–1.4 |
| Cu | 0.2–2.0 |
| Mg | 0.1–0.6 |
| Si | 0.15–1.0 |
| Fe | 0.8 max. |
| Zn | 0.25 max. |
| Ti | 0.15 max. |
| Cr | 0.35 max. |

Zr and/or V in total 0.25 max.
other impurities at most 0.05 each, total other impurities at most 0.15 balance aluminium,
and with the provision that (Cu+Mg)>0.7;
in a Controlled Atmosphere Brazing (CAB) process, wherein the aluminum extrusion alloy is part of an extruded section, and further comprising ageing the extruded section such that the extruded section has a 0.2% yield strength of at least 270 MPa.

2. The method of claim 1, wherein the Cu-content is in the range of 0.65–2.0%.

3. The method of claim 1, wherein the Cu-content is in the range of 0.65–0.90%.

4. The method of claim 1, wherein (Cu+Mg)>1.0%.

5. The method of claim 1, wherein the Si-content is in the range of 0.30–1.0%.

6. The method of claim 5, wherein the Si-content is in the range of 0.4–1.0%.

7. The method of claim 6, wherein the Si-content is in the range of 0.4–0.7%.

8. The method of claim 1, wherein the Si-content is in the range of 0.4–0.6%.

9. The method of claim 1, wherein the Fe-content is not more than 0.4%.

10. The method of claim 1, wherein the Mg-content is in the range of 0.1–0.35%.

11. The method of claim 1, wherein the Mg-content is in the range of 0.3–0.6%.

12. The method of claim 1, further comprising ageing, such that the extruded section has an ultimate tensile strength of at least 290 MPa.

13. The method of claim 1, further comprising providing the extruded section in a T8 condition.

14. The method of claim 1, further comprising providing the extruded section in a T9 condition.

15. The method of claim 1, wherein the alloy consists of, in weight percent:

| | |
|---|---|
| Mn | 1.0–1.4 |
| Cu | 0.2–2.0 |
| Mg | 0.1–0.6 |
| Si | 0.15–1.0 |
| Fe | 0.8 max. |
| Zn | 0.25 max. |
| Ti | 0.15 max. |
| Cr | 0.35 max. |

Zr and/or V in total 0.25 max.
other impurities at most 0.05 each, total other impurities at most 0.15 balance aluminium,
with the proviso that (Cu+Mg)>0.7.

16. A method of manufacturing an assembly of brazed components, comprising the steps of:

(a) forming said components of which at least one is made from an aluminium extrusion alloy of composition in weight %:

| | |
|---|---|
| Mn | 1.0–1.4 |
| Cu | 0.2–2.0 |
| Mg | 0.1–0.6 |
| Si | 0.15–1.0 |
| Fe | 0.8 max. |
| Zn | 0.25 max. |
| Ti | 0.15 max. |
| Cr | 0.35 max. |

Zr and/or V in total 0.25 max.
other impurities at most 0.05 each, total other impurities at most 0.15 balance aluminium,
and with the provision that (Cu+Mg)>0.7; wherein the aluminum extrusion alloy is part of an extruded section, and further comprising ageing the extruded section such that the extruded section has a 0.2% yield strength of at least 270 MPa;

(b) assembling the components into an assembly;

(c) brazing the assembly at elevated temperature for a period long enough for melting and spreading of filler material;

(d) cooling the brazed assembly to below 100° C.; and (e) ageing of the brazed and cooled assembly to achieve a 0.2% yield strength of at least 100 MPa.

17. A method according to claim 16, wherein the brazing step (c) further comprises using a brazing flux and a controlled atmosphere.

18. A method according to claim 16, wherein during step (d) the brazed assembly is cooled to below 100° C. with a cooling rate of at least 50° C./min.

19. A method according to claim 16, wherein the ageing of the brazed and cooled assembly achieves a 0.2% yield strength of at least 120 MPa.

20. The method of claim 16, wherein during step (d) the brazed assembly is cooled to below 100° C. with a cooling rate of at least 60° C./min.

21. The method of claim 16, wherein during step (d) the brazed assembly is cooled to below 100° C. with a cooling rate of at least 70° C./min.

22. The method of claim 16, wherein the alloy consists of, in weight percent:

| | |
|---|---|
| Mn | 1.0–1.4 |
| Cu | 0.2–2.0 |
| Mg | 0.1–0.6 |
| Si | 0.15–1.0 |
| Fe | 0.8 max. |
| Zn | 0.25 max. |
| Ti | 0.15 max. |
| Cr | 0.35 max. |

Zr and/or V in total 0.25 max.
other impurities at most 0.05 each, total other impurities at most 0.15 balance aluminium,
with the proviso that (Cu+Mg)>0.7.

23. The method of claim 16, wherein the Si-content is in the range of 0.30–1.0%.

24. The method of claim 16, wherein the Cu-content is in the range of 0.65–2.0%.

25. The method of claim 16, wherein (Cu+Mg)>1.0%.

26. The method of claim 16, further comprising providing the extruded section in a T8 condition.

27. The method of claim 16, further comprising providing the extruded section in a T9 condition.

28. A method of manufacturing an assembly of brazed components, comprising the steps of:
(a) forming said components of which at least one is made from an extruded section obtained from a method of manufacturing the extruded section of an aluminium extrusion alloy, comprising the sequential steps of:
(i) casting the alloy into ingots having the following composition in weight percent:

| | |
|---|---|
| Mn | 1.0–1.4 |
| Cu | 0.2–2.0 |
| Mg | 0.1–0.6 |
| Si | 0.15–1.0 |
| Fe | 0.8 max. |
| Zn | 0.25 max. |
| Ti | 0.15 max. |
| Cr | 0.35 max. |

Zr and/or V in total 0.25 max.
other impurities at most 0.05 each, total other impurities at most 0.15 balance aluminium,
and with the proviso that (Cu+Mg)>0.7;
(ii) preheating the cast ingot;
(iii) hot extrusion of the preheated cast ingot into an extruded product;
(iv) rapid cooling of the extruded product to below 150° C.; and
(v) ageing of the extruded product as the extruded section such that the extruded section has a 0.2% yield strength of at least 270 MPa;
(b) assembling the components into an assembly;
(c) brazing the assembly at elevated temperature for a period long enough for melting and spreading of filler material;
(d) cooling the brazed assembly to below 100° C.; and
(e) ageing of the brazed and cooled assembly to achieve a 0.2% yield strength of at least 100 MPa.

29. A method according to claim 28, wherein the ageing of the brazed and cooled assembly achieves a 0.2% yield strength of at least 120 MPa.

30. The method of claim 28, wherein the Cu-content is in the range of 0.65–2.0%.

31. The method of claim 28, wherein the Cu-content is in the range of 0.65–0.90%.

32. The method of claim 28, wherein (Cu+Mg)>1.0%.

33. The method of claim 28, wherein the Si-content is in the range of 0.30–1.0%.

34. The method of claim 33, wherein the Si-content is in the range of 0.4–1.0%.

35. The method of claim 34, wherein the Si-content is in the range of 0.4–0.7%.

36. The method of claim 35, wherein the Si-content is in the range of 0.4–0.6%.

37. The method of claim 28, wherein the Fe-content is not more than 0.4%.

38. The method of claim 28, wherein the Mg-content is in the range of 0.1–0.35%.

39. The method of claim 28, wherein the Mg-content is in the range of 0.3–0.6%.

40. The method of claim 28, further comprising ageing, such that the extruded section has an ultimate tensile strength of at least 290 MPa.

41. The method of claim 28, further comprising providing the extruded section in a T8 condition.

42. The method of claim 28, further comprising providing the extruded section in a T9 condition.

43. The method of claim 28, wherein the alloy consists of, in weight percent:

| | |
|---|---|
| Mn | 1.0–1.4 |
| Cu | 0.2–2.0 |
| Mg | 0.1–0.6 |
| Si | 0.15–1.0 |
| Fe | 0.8 max. |
| Zn | 0.25 max. |
| Ti | 0.15 max. |
| Cr | 0.35 max. |

Zr and/or V in total 0.25 max.
other impurities at most 0.05 each, total other impurities at most 0.15 balance aluminium,
with the proviso that (Cu+Mg)>0.7.

44. The method according to claim 28, wherein the method of manufacturing the extruded section further comprises prior to step (ii) the step of homogenising the cast ingot in a temperature range of 560 to 610° C. for a soaking time in the range of 5 to 24 hours.

45. The method according to claim 28, wherein the hot extrusion during step (iii) is carried out with an extrusion billet in a temperature range of 500 to 540° C.

* * * * *